3,787,449
Patented Jan. 22, 1974

3,787,449
MANUFACTURE OF 2-(3-HYDROXY-3-OPTIONAL-
LY ALKYLATED - 1 - ALKYNYL)-3-HYDROXY-
5-OXOCYCLOPENT - 1 - ENEALKANOIC ACIDS
AND ESTERS
Paul W. Collins, Deerfield, and Raphael Pappo, Skokie,
Ill., assignors to G. D. Searle & Co., Chicago, Ill.
No Drawing. Filed July 10, 1972, Ser. No. 270,434
Int. Cl. C07d 7/04
U.S. Cl. 260—345.7       9 Claims

ABSTRACT OF THE DISCLOSURE

Treatment of 2-alkoxy-4-hydroxy-5-oxocyclopent-1-ene-alkonic acids and their lower alkyl esters with lithium tetra(3-[tetrahydropyran-2-yl]oxy-1 - alkynyl) aluminate affords the corresponding 2-(3-[tetrahydropyran-2-yl]oxy-1-alkynyl)-3-hyrdoxy-5-oxocyclopent-1 - enealkanoic acids and esters. Subsequent cleavage of the ether function yields the 2-(3-hydroxy-1-alkynyl)-3-hydroxy-5-oxocyclopent-1-enealkanoic acids and esters. The latter compounds are useful as pharmacological agents as is evidenced by their anti-ulcerogenic, hypotensive and smooth muscle-stimulating properties.

This invention is concerned generally with a process for the preparation of acetylenic cyclopentane-alkanoic acids. More particularly, it is concerned with a process for manufacturing alkynylated cyclopentenealkanoic acids of the following structural formula

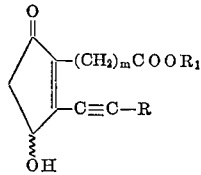

(I)

wherein $R_1$ is hydrogen or a lower alkyl radical and R is a 1-hydroxycyclopentyl, 1-(tetrahydropyran-2-yl)oxycyclopentyl, tri-(lower alkyl)siloxycyclopentyl, 1-hydroxycyclohexyl, 1-(tetrahydropyran-2-yl)oxycyclohexyl or tri-(lower alkyl)siloxycyclohexyl radical or a radical of the formula

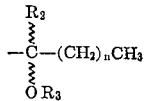

wherein $R_2$ is hydrogen or a lower alkyl radical, $R_3$ is hydrogen or a tetrahydropyran-2-yl or tri-(lower alkyl)-silyl radical and $n$ is an integer greater than 1 and less than 6, $m$ is an integer greater than 5 and less than 8 and the wavy lines represent the (R), (S), or (RS) configuration.

The instant process is practiced by contacting a compound of the formula

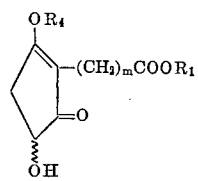

(II)

wherein $R_1$ and $m$ are defined as above and $R_4$ is a lower alkyl radical, with a lithium tetraalkynyl aluminate of the formula

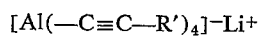

[Al(—C≡C—R')$_4$]⁻Li⁺       (III)

wherein R' is a 1-(tetrahydropyran-2-yl)oxycyclopentyl, 1 - (tetrahydropyran - 2 - yl)oxycyclohexyl, 1-tri(lower alkyl)siloxycyclopentyl or 1-tri-(lower alkyl)siloxycyclohexyl radical or a radical of the formula

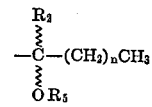

wherein $R_2$ and $n$ are defined as above and $R_5$ is a tetrahydropyran-2-yl or tri(lower alkyl)silyl radical, thereby producing a compound of the formula

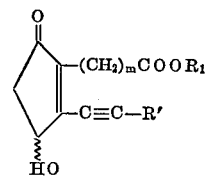

(IV)

wherein $R_1$, R' and $m$ are defined as above.

The compounds of Formula IV are valuable intermediates since the ether function is cleaved readily under mildly acidic conditions to afford the compounds of the formula

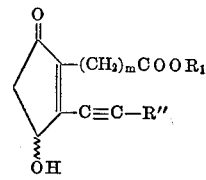

(V)

wherein $R_1$ and $m$ are as defined previously and R" is a 1-hydroxycyclopentyl or 1-hydroxycyclohexyl radical or a radical of the formula

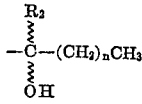

with $R_2$ and $n$ being the same as above.

The compounds represented by Formula V are useful as pharmacological agents. For example, they exhibit anti-ulcerogenic, hypotensive and smooth muscle-stimulating activity. The anti-ulcerogenic activity is determined by an assay described in U.S. Pat. 3,483,192 and the hypotensive activity is determined by the following assay:

Male Charles River rats weighing 100–350 g. are used. Each animal is anesthetized by intraperitoneal injection of 1.5 g./kg. of urethane, whereupon cardiovascular reflexes are blocked by subcutaneous injection of 3 mg. of atropine sulfate dissolved in 0.3 ml. of aqueous 0.85% sodium chloride and sensitization is induced by subcutaneous injection of 5 mg. of pentolinium tartrate dissolved in 1 ml. of aqueous 0.85% sodium chloride. The trachea is intubated and both femoral veins and carotid artery are cannulated, the latter being connected to a calibrated transducer, amplifier and recorder. After surgery, 5 mg./kg. of heparin sodium is introduced via one of the venus cannulae as a 2% solution in aqueous 0.85% sodium chloride and rectal temperature is adjusted to 35° C. by means of a regulator and external heat source. When the animal's blood pressure and temperature have stabilized, a high and low dose, with a ratio of high dose to low dose of 2:1, of the test compound and a high and low dose, also in a ratio of 2:1, of the standard prostaglandin E₂ are individually administered intravenously and in a random pattern and the blood pressure measured after each injection. The blood pressure of the animal is permitted to return to normal between successive injections. The relative potency of the test compound compared to the standard prostaglandin $E_2$ is determined by a 4-point bioassay using a randomized block design. The results are analyzed by the method of C. I. Bliss, The Stastistics of Bioassay, Academic Press, New York (1952).

The smooth muscle-stimulating property of the instant compounds of the present invention is shown by the following assays:

A segment of one of the uterine horns of a freshly killed rat is removed after determining that the rat is in the diestrus phase of the ovarian cycle by microscopic examination of a vaginal washing. The segment is mounted in a 2 ml. tissue bath containing de Jalon solution maintained at 37° C. and bubbled with a gaseous mixture of 95% oxygen and 5% carbon dioxide. Longitudinal contractions of the tissue elicited by 1 mcg./ml. and 2 mcg./ml. of the test compound are measured isotonically and compared to those elicited by 0.1 mcg./ml. and 0.2 mcg./ml. of standard preparation of prostaglandin $E_2$. The relative potency of the test compound compared to the standard prostaglandin preparation is determined by a 4-point bioassay using a randomized block design. Results are analyzed by the aforementioned method of Bliss.

A segment of duodenum from a freshly killed rabbit is mounted in a 4 ml. tissue bath containing Tyrode solution maintained at 37° C., through which is bubbled a gaseous mixture of 95% oxygen and 5% carbon dioxide. Longitudinal contractions of the tissue educed by 0.625 mcg./ml. and 1.25 mcg./ml. of the test compound are measured isotonically and compared to those educed by 0.025 mcg./ml. and 0.05 mcg./ml. of standard preparation of prostaglandin $E_2$. The relative potency of the test compound compared to that of the standard is determined by a 4-point bioassay using a randomized block design, and results are analyzed by the aforementioned method of Bliss.

A segment of distal ileum from a freshly killed guinea pig is mounted in a 2 ml. tissue bath containing modified Tyrode solution with ½ of the usual concentration of magnesium ions. The temperature is maintained at 37° C. and the solution is bubbled with a gaseous mixture of 95% oxygen and 5% carbon dioxide. Longitudinal contraction of the tissue elicited by 5 mcg./ml. and 10 mcg./ml. of the test compound are measured isotonically and compared to those elicited by 0.05 mcg./ml. and 0.1 mcg./ml. of a standard preparation of prostaglandin $E_2$. The relative potency of the test compound is determined by the procedure of Bliss described above.

For the purpose of this invention the lower alkyl radicals represented herein contain up to 7 carbon atoms inclusive and are illustrated by methyl, ethyl, propyl, butyl, pentyl, hexyl, heptyl and the branched-chain radicals isomeric therewith.

The process is carried out in a suitably inert solvent illustrated by tetrahydrofuran, ether and the like. Tetrahydrofuran particularly is preferred as a solvent because of the high degree of solubility of the reactants therein.

The process generally is run at temperatures between 0° C. to 40° C., but that range is not deemed limiting. It has been found convenient and preferable to carry out the process at a temperature between about 15° C. to 25° C.

Processing time is a critical with times in the range of 1–24 hours being typical. It is understood that the general reaction parameters may be varied and chosen according to standard chemical manufacturing procedures as will be apparent to those skilled in the art.

The starting materials which are useful in the process can be prepared by methods described by Pappo et al., Annals of the N.Y. Academy of Sciences, 180, 64 (1971) and the methods described in U.S. Pat. 3,558,682. Thus, for example, the cyclopenteneoctanoic acid derivatives are prepared by replacing 9-oxodecanoic acid with 10-oxoundecanoic acid in those procedures.

The lithium tetraalkynyl aluminum compounds are employed in situ and are prepared by successively treating the optionally alkylated 3-(tetrahyropyran-2-yl)oxy-1-alkyne, 3-trialkylsiloxy-1-alkyne or the appropriate cycloalkylethynyl derivative with butyl lithium and aluminum trichloride in an inert solvent. The molar ratio of butyl lithium and the 3-ethers to aluminum trichloride is 4:1. Typically, 3-(tetrahydropyran-2-yl)oxy - 1 - octyne is treated successively in tetrahydrofuran with butyl lithium and aluminum trichloride at —40° C. Then, methyl 4-hydroxy-2-methoxy-5-oxocyclopent - 1 - eneheptanoate is added. Subsequent acid addition affords methyl 3-hydroxy-2-[3-tetrahydropyran-2-yl)oxy-1-octynyl] - 5 - oxocyclopent - 1 - eneheptanoate. Hydrolysis of that compound with a solution of aqueous hydrochloric acid and methanol provides methyl 3-hydroxy-2-(3-hydroxy-1-octynyl)-5-oxocyclopent-1-eneheptanoate.

Although the compounds of Formula I wherein $R_1$ is hydrogen can be prepared from the compounds of Formula II wherein $R_1$ is hydrogen according to the instant process, they can be produced alternatively and preferably by basic hydrolysis of the appropriate esters. For example, basic hydrolysis of methyl 3-hydroxy-2-(3-hydroxy - 1 - octynyl) - 5 - oxocyclopent - 1 - eneheptanoate with aqueous potassium carbonate followed by acidification with dilute hydrochloric acid affords 3-hydroxy-2-(3-hydroxy-1-octynyl) - 5 - oxocyclopent-1-eneheptanoic acid.

The 3-hydroxy-2-(3-optionally alkylated-3-hydroxy-1-alkynyl)-5-oxocyclopent-1-enealkanoic acids and esters are produced according to the instant process by utilizing the appropriately substituted alkyn-3-ol in the preparation of the alkynol ethers. Utilization of the resolved alkynol affords the R or S alkynol ethers. Those optically active compounds are used to prepare optically active starting materials which are employed in the process described herein to afford the corresponding optically active 3-hydroxy-2-(3(R)-hydroxy-1-alkynyl) - 5 - oxocyclopent-1-enealkanoic acids and esters or 3-hydroxy-2-(3(S)-hydroxy - 1 - alkynyl) - 5 - oxocyclopent - 1 - enealkanoic acids and esters.

Although the instant process is illustrated particularly using the tetrahydropyranyl radicals as the protecting group, it is understood that other blocking groups may be used as well. For example, tri(lower alkyl)-silyl radicals, as illustrated by dimethyl-t-butylsilyl, can be employed. However, the tetrahydropyranyl group is preferred.

Cleavage of the protecting groups has been found to occur readily under mildly acidic conditions, as for example, those conditions provided by an aqueous methanolic hydrogen chloride solution. Other hydrolytic acid systems may be used however. Suitable hydrolytic acid systems should not cause such severe conditions that the 3-hydroxy substituents on the cyclopentene ring or the resulting 15-hydroxy substituent are destroyed.

This invention will appear more fully from the examples which follow. The examples are given by way of illustration only and are not to be construed as limiting the invention either in spirit or in scope as many modifications both in materials and methods will be apparent to those skilled in the art. In these examples temperatures are given in degrees centigrade (° C.) and quantities of materials in parts by weight unless otherwise noted. The relationship between parts by weight and parts by volume is the same as that existing between grams and milliliters.

EXAMPLE 1

A solution of 16.8 parts of 3(S)-(tetrahydropyran-2-yl)oxy-1-octyne in 133 parts of tetrahyrofuran, cooled to —40°, is treated with 35 parts by volume of a 2.28 M butyl lithium in hexane solution and stirred at room temperature for 1 hour. Then the solution is cooled again to —40° and 2.68 parts of aluminum trichloride is added portionwise. The solution is stirred at room temperature for 1½ hours and 4.86 parts of methyl 2-methoxy-4-hydroxy-5-oxocyclopent - 1 - eneheptanoate (in 44.5 parts of tetrahydrofuran) then is added. The solution is stirred for 2 hours at room temperature, then poured into a mixture of ether and dilute aqueous hdyrochloric acid. The ethereal layer is separated and the solvent is removed under reduced pressure. The crude product which remains is dissolved in methanol, acidified with dilute hydrochloric acid and allowed to stand for 16 hours. Then the methanol is removed and the material which remains is extracted into ethyl acetate. The solvent is evaporated to afford methyl 2-(3(S)-hydroxy-1-octynyl)-3 - hydroxy-5-oxocyclopent-1-eneheptanoate.

EXAMPLE 2

1.0 part of methyl 2-(3(S)-hydroxy-1-octynyl)-3-hydroxy-5-oxocyclopent - 1 - eneheptanoate is dissolved in methanol and 100 parts by volume of a 5% aqueous potassium carbonate solution is added. That solution is allowed to stand for about 16 hours and the methanol then is removed under reduced pressure. The basic solution which remains is extracted with ethyl acetate, then acidified with dilute hydrochloric acid and extracted again with ethyl acetate. The ethyl acetate extracts are dried over anhydrous sodium sulfate and stripped of solvent. The crude residual product is chromatographed on silicic acid and eluted with 10% ethyl ether-benzene to obtain pure 2-(3(S)-hydroxy-1-octynyl)-3-hydroxy - 5 - oxocyclopent-1-eneheptanoic acid.

EXAMPLE 3

When an equivalent quantity of 3(RS)-(tetrahydropyran-2-yl)oxy-1-octyne is substituted in the procedure of Example 1, there is afforded methyl 2-(3(RS)-hydroxy-1-octynyl)-3-hydroxy-5-oxocyclopent-1-eneheptanoate.

EXAMPLE 4

By substituting an equivalent quantity of 3(R)-(tetrahydropyran-2-yl)oxy-1-octyne in the procedure of Example 1, there is obtained methyl 2-(3(R)-hydroxy-1-octynyl)-3-hydroxy-5-oxocyclopent-1-eneheptanoate.

EXAMPLE 5

Substitution of an equivalent quantity of ethyl 2-methoxy-4-hydroxy - 5 - oxocyclopent-1-eneheptanoate in the procedure of Example 1 affords ethyl 2-(3(S)-hydroxy-1-octynyl)-3-hydroxy-5-oxocyclopent-1-eneheptanoate.

EXAMPLE 6

By substituting equivalent quantities of methyl 2-ethoxy-4-hydroxy - 5 - oxocyclopent - 1 - eneheptanoate and 3(RS)-3-methyl-3-(tetrahydropyran-2-yl)oxy-1-octyne in the procedure of Example 1, there is afforded methyl 2-(3(RS)-3-methyl - 3 - hydroxy - 1 - octynyl)-3-hydroxy-5-oxocyclopent-1-eneheptanoate.

EXAMPLE 7

Substitution of equivalent quantities of methyl 2-methoxy-4-hydroxy - 5 - oxocyclopent - 1 - eneoctanoate and 3(RS)-(tetrahydropyran-2-yl)oxy-1-heptyne in the procedure of Example 1 affords methyl 2-(3(RS)-hydroxy-1-heptynyl)-3-hydroxy-5-oxocyclopent-1-eneoctanoate.

EXAMPLE 8

By substituting an equivalent quantity of 1-ethynyl-1-(tetrahydropyran-2-yl)oxycyclohexane in the procedure of Example 1, there is afforded methyl 2-[(1-hydroxycyclohexyl)ethynyl]-3-hydroxy - 5 - oxocyclopent-1-eneheptanoate.

What is claimed is:

1. The process for producing a compound of

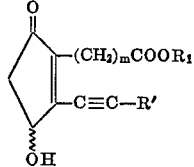

wherein $R_1$ is hydrogen or a lower alkyl radical, R' is a 1 - (tetrahydropyran-2-yl)oxycyclopentyl, 1-(tetrahydropyran-2-yl)oxycyclohexyl, 1-tri(lower alkyl)siloxycyclopentyl, 1-tri(lower alkyl)siloxycyclohexyl radical or a radical of the formula

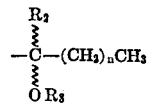

with $R_2$ being hydrogen or a lower alkyl radical, $R_3$ being a tetrahydropyran-2-yl or tri(lower alkyl)silyl radical and $n$ being an integer greater than 1 and less than 6, $m$ is an integer greater than 5 and less than 8 and the wavy line represents the (R), (S), or (RS) configuration, which comprises contacting a compound of the formula

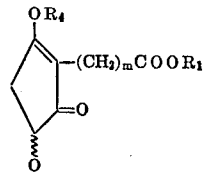

wherein $R_1$ and $m$ are defined as above and $R_4$ is a lower alkyl radical, with a compound of the formula $$[Al(-C{\equiv}C-R')_4]^-Li^+$$

wherein R' is defined hereinabove.

2. The process as in claim 1 for producing a compound of the formula

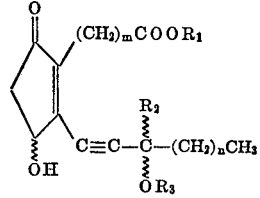

which comprises contacting a compound of the formula

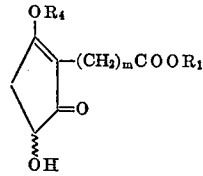

with a compound of the formula

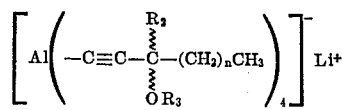

wherein $R_1$ and $R_2$ are hydrogen or lower alkyl radicals, $R_3$ is a tetrahydropyran-2-yl or tri(lower alkyl)silyl radical, $R_4$ is a lower alkyl radical, $m$ is an integer greater than 5 and less than 8, $n$ is an integer greater than 1 and less than 6 and the wavy lines represent the (R), (S) or (RS) configuration.

3. The process as in claim 2, wherein $R_3$ is a tetrahydropyran-2-yl radical.

4. The process as in claim 2 for producing a compound of the formula

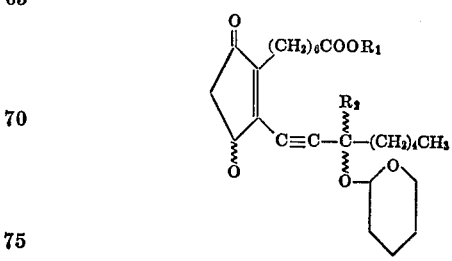

which comprises contacting a compound of the formula

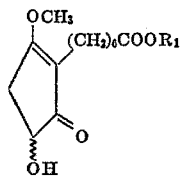

with a compound of the formula

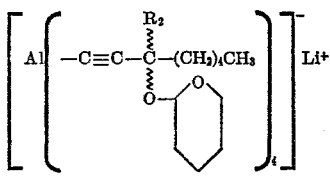

wherein $R_1$ is hydrogen or a lower alkyl radical and $R_2$ is hydrogen or a methyl radical.

5. The process for producing a compound of the formula

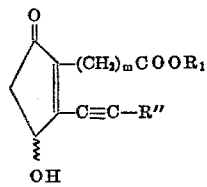

wherein $R_1$ and $m$ are defined as in claim 1 and $R''$ is a 1-hydroxycyclopentyl or 1-hydroxycyclohexyl radical or a radical of the formula

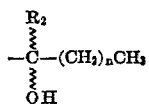

with $R_2$ and $n$ being the same as in claim 1, which comprises the steps of:

(a) contacting a compound of the formula

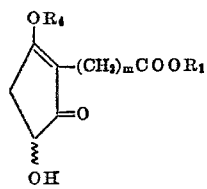

wherein $R_1$, $R_4$ and $m$ are defined as in claim 1, with a compound of the formula

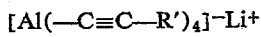

$$[Al(\!\!-\!\!C\!\equiv\!\!C\!\!-\!\!R')_4]^-Li^+$$

with $R'$ being defined as in claim 1, to form, as an unisolated intermediate, a compound of the formula

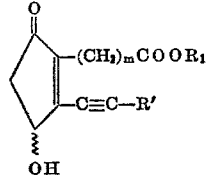

wherein $R_1$, $R'$ and $m$ are defined as in claim 1;

(b) contacting said unisolated intermediate with a hydrolytic acid; and
(c) isolating a compound of the formula

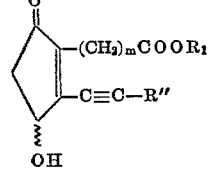

wherein $R_1$ and $m$ are defined as in claim 1 and $R''$ is defined as above.

6. The process as in claim 5 for producing a compound of the formula

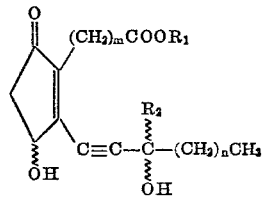

which comprises the steps of:

(a) contacting a compound of the formula

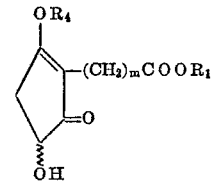

with a compound of the formula

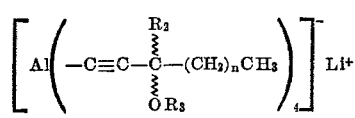

to form, as an unisolated intermediate, a compound of the formula

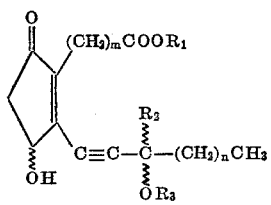

(b) contacting said unisolated intermediate with a hydrolytic acid and isolating a compound of the formula

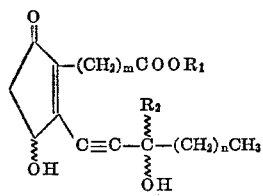

wherein $R_1$ and $R_2$ are hydrogen or lower alkyl, $R_3$ is a tetrahydropyran-2-yl or tri(lower alkyl)silyl radical, $R_4$ is a lower radical, $m$ is an integer greater than 5 and less than 8, $n$ is an integer greater than 1 and less than 6 and the wavy lines represent the (R), (S) or (RS) configuration.

7. The process as in claim 6, wherein $R_1$ is hydrogen or a lower alkyl radical, $R_2$ is hydrogen or a lower alkyl radical, $R_3$ is a tetrahydropyran-2-yl radical, $R_4$ is a methyl radical, $m$ is the integer 6, $n$ is the integer 4 and the hydrolytic acid is aqueous hydrochloric acid.

8. The process as in claim 6 for producing a compound of the formula

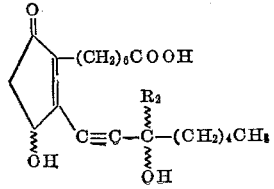

which comprises the steps of:
(a) contacting a compound of the formula

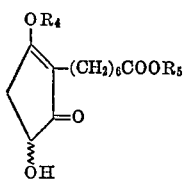

with a compound of the formula

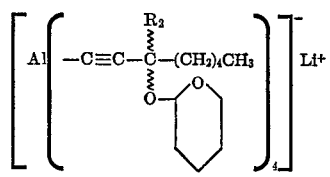

to form, as an unisolated intermediate, a compound of the formula

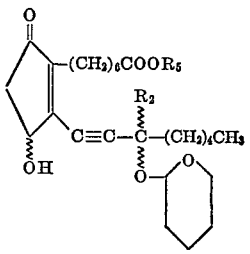

(b) contacting said unisolated intermediate with a hydrolytic acid to form a compound of the formula

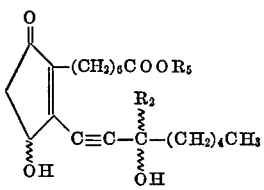

(c) contacting the compound of Step (b) successively with a basic hydrolyzing agent and a mineral acid, and
(d) isolating the resulting compound of the formula

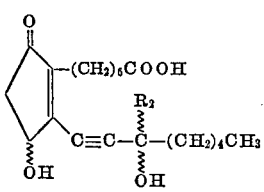

wherein $R_2$ is hydrogen or a methyl radical, $R_4$ and $R_5$ are lower alkyl radicals and the wavy lines represent the (R), (S) or (RS) configuration.

9. The process as in claim 8 are producing a compound of the formula

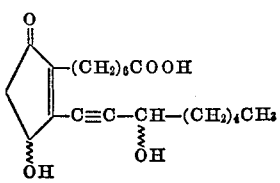

wherein the stereochemical configuration at the 15-carbon atom is 15(S), which comprises the steps of:
(a) contacting a compound of the formula

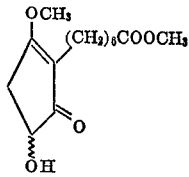

with a compound of the formula

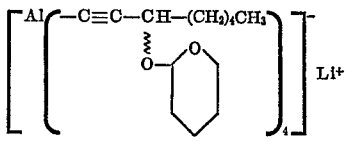

wherein the stereochemical configuration at the 3-carbon atom is 3(S) to form, as an unisolated intermediate, a compound of the formula

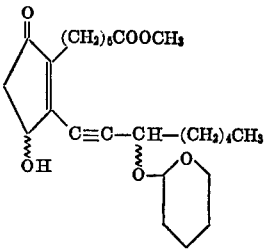

wherein the stereochemical configuration at the 15-carbon atom is 15(S);
(b) contacting said unisolated intermediate with aqueous hydrochloric acid to form a compound of the formula

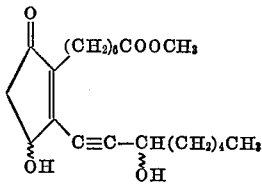

wherein the stereochemical configuration at the 15-carbon atom is 15(S);
(c) contacting the compound of Step (b) successively with aqueous potassium carbonate and aqueous hydrochloric acid; and
(d) isolating the compound of the formula

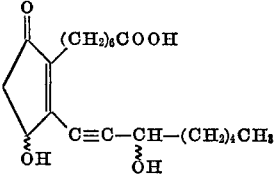

wherein the stereochemical configuration at the 15-carbon atom is 15(S).

References Cited
UNITED STATES PATENTS
3,732,267   5/1973   Miyano _____ 260—413

HENRY R. JILES, Primary Examiner
G. T. TODD, Assistant Examiner

U.S. Cl. X.R.
260—345.8, 450.5, 410.9 R, 448.8 R, 468 D, 514 D; 424—305; 260—448.2 B

UNITED STATES PATENT OFFICE
CERTIFICATE OF CORRECTION

Patent No. 3,787,449                    Dated January 22, 1974

Inventor(s) Paul W. Collins and Raphael Pappo

It is certified that error appears in the above-identified patent and that said Letters Patent are hereby corrected as shown below:

Column 1, line 15, "alkonic acids" should be -- alkanoic acids --.

Column 1, line 18, "-3-hyrdroxy" should be -- -3-hydroxy --.

Column 2, second formula,

" $\xi$ " should be -- $\xi$ --.
  HO                        OH

Column 3, line 62, "a critical" should be -- acritical --.

Column 4, line 1, "3-(tetrahyropyran" should be -- 3-(tetrahydropyran --.

Column 5, line 2, "hdyrochloric" should be -- hydrochloric --.

Column 5, line 67, after "compound of" insert -- the formula --.

Column 6, second formula,

" $\xi$ " should be -- $\xi$ --.
  O                         OH

Column 6, seventh formula,

UNITED STATES PATENT OFFICE
CERTIFICATE OF CORRECTION

Patent No. 3,787,449          Dated January 22, 1974

Inventor(s) Paul W. Collins and Raphael Pappo

It is certified that error appears in the above-identified patent and that said Letters Patent are hereby corrected as shown below:

" 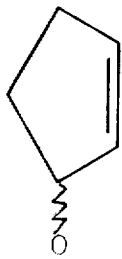 " should be -- 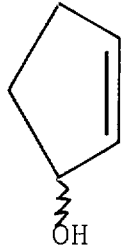 --.

Column 9, line 63, "are" should be -- for --.

Signed and sealed this 17th day of September 1974.

(SEAL)
Attest:

McCOY M. GIBSON JR.
Attesting Officer

C. MARSHALL DANN
Commissioner of Patents